(12) United States Patent
Schüler et al.

(10) Patent No.: US 9,469,221 B2
(45) Date of Patent: Oct. 18, 2016

(54) FITTING SYSTEM FOR A VEHICLE SEAT

(75) Inventors: Rolf Schüler, Heiligenhaus (DE);
Bernd Bossmanns, Mettmann (DE);
Uwe Assmann, Remscheid (DE)

(73) Assignee: KEIPER GMBH & CO. KG,
Kaiserslautern (DE)

( * ) Notice: Subject to any disclaimer, the term of this patent is extended or adjusted under 35 U.S.C. 154(b) by 200 days.

(21) Appl. No.: 14/130,721

(22) PCT Filed: Jun. 15, 2012

(86) PCT No.: PCT/EP2012/061450
§ 371 (c)(1),
(2), (4) Date: Jan. 3, 2014

(87) PCT Pub. No.: WO2013/004471
PCT Pub. Date: Jan. 10, 2013

(65) Prior Publication Data
US 2014/0132053 A1 May 15, 2014

(30) Foreign Application Priority Data

Jul. 4, 2011 (DE) .......................... 10 2011 106 285
Sep. 30, 2011 (DE) .................... 20 2011 106 338 U

(51) Int. Cl.
*B60N 2/02* (2006.01)
*B60N 2/235* (2006.01)

(52) U.S. Cl.
CPC ............. *B60N 2/236* (2015.04); *B60N 2/2356* (2013.01)

(58) Field of Classification Search
CPC ...... A47C 1/026; B60N 2/34; B60N 2/2356; B60N 2/236

USPC ............................ 297/363–365, 367 L, 367 P
See application file for complete search history.

(56) References Cited

U.S. PATENT DOCUMENTS

| 5,524,970 A * | 6/1996 | Kienke ................ B60N 2/2255 |
| | | 297/362 |
| 5,871,414 A * | 2/1999 | Voss ..................... B60N 2/2254 |
| | | 475/162 |

(Continued)

FOREIGN PATENT DOCUMENTS

| CN | 1 419 503 A | 5/2003 |
| CN | 101 277 843 A | 10/2008 |

(Continued)

*Primary Examiner* — David R Dunn
*Assistant Examiner* — Alexander Harrison
(74) *Attorney, Agent, or Firm* — McGlew and Tuttle, P.C.

(57) ABSTRACT

A fitting system for a vehicle seat having a fitting (10), which has a first fitting part (11) and a second fitting part (12), which fitting parts can be locked to one another and can be rotated relative to one another about an axis (A). A transmission rod (7) rotates during an unlocking process to unlock the fitting (10) against the torque and follows a characteristic curve ($M_{35}$) generated by a spring arrangement (35). A hand lever (5) initiates the unlocking process, the actuation of which rotates the transmission rod (7). A shaped spring (61) is active between a first component (63) and a second component (64) which rotate, relative to one another during the unlocking process. The torque generated by the shaped spring follows a non-linear characteristic curve ($M_{61}$) which, together with the approximately linear characteristic curve ($M_{35}$) of the spring arrangement (35), produces an overall characteristic curve ($M_{overall}$).

20 Claims, 18 Drawing Sheets

(56) References Cited

U.S. PATENT DOCUMENTS

| | | | | |
|---|---|---|---|---|
| 7,204,555 B2* | 4/2007 | Thiel | B60N 2/2356 | 297/364 |
| 7,384,101 B2* | 6/2008 | Kawashima | B60N 2/2252 | 297/362 |
| 7,513,572 B2* | 4/2009 | Kawashima | B60N 2/2252 | 297/362 |
| 7,950,741 B2* | 5/2011 | Mitsuhashi | B60N 2/2227 | 297/362 |
| 8,297,704 B2* | 10/2012 | Endo | B60N 2/2356 | 297/367 L |
| 8,366,197 B2* | 2/2013 | Aktas | B60N 2/2218 | 297/367 R |
| 8,708,412 B2* | 4/2014 | Berndtson | B60N 2/2356 | 297/367 L |
| 8,720,999 B2* | 5/2014 | Peters | B60N 2/2356 | 297/367 L |
| 8,931,843 B2* | 1/2015 | Schuler | B60N 2/2252 | 297/367 R |
| 9,096,152 B2* | 8/2015 | Zynda | B60N 2/2252 | |
| 9,156,378 B2* | 10/2015 | Hoshi | B60N 2/2356 | |
| 2012/0169105 A1 | 7/2012 | Assmann et al. | | |

FOREIGN PATENT DOCUMENTS

| | | |
|---|---|---|
| CN | 101 415 584 A | 4/2009 |
| DE | 196 33 782 C1 | 3/1998 |
| DE | 198 14 983 A1 | 10/1999 |
| DE | 10 2005 046807 B3 | 11/2006 |
| DE | 100 38 778 B4 | 5/2007 |
| DE | 10 2006 015560 B3 | 8/2007 |
| DE | 20 2009 016 989 U1 | 4/2010 |
| DE | 20 2010 015171 U1 | 2/2011 |
| JP | 2007-135847 A | 6/2007 |
| JP | 2008-289699 A | 12/2008 |

* cited by examiner

FITTING SYSTEM FOR A VEHICLE SEAT

CROSS REFERENCE TO RELATED APPLICATIONS

This application is a United States National Phase Application of International Application PCT/EP2012/061450 filed Jun. 15, 2012 and claims the benefit of priority under 35 U.S.C. §119 of German Patent Application DE 10 2011 106 285.1 filed Jul. 4, 2011 and German Utility Model Application DE 20 2011 106 338.4 filed Sep. 30, 2011, the entire contents of which are incorporated herein by reference.

FIELD OF THE INVENTION

The invention relates to a fitting system for a vehicle seat, in particular a motor vehicle seat, with the system comprising a fitting with a first fitting part and a second fitting part that are lockable to each other and are rotatable relative to each other about an axis, a transmission rod, the rotation of which, during an unlocking operation, unlocks the fitting counter to a torque which follows a characteristic produced by a spring arrangement, and a hand lever for initiating the unlocking operation, the actuation of which hand lever rotates the transmission rod.

BACKGROUND OF THE INVENTION

A fitting system of this type is known from DE 20 2010 015 171 U1. Actuation of the hand lever causes rotation of the transmission rod which, in turn, unlocks the two fittings counter to the force of the spring arrangements contained therein. The torque characteristic of the spring arrangements serving to secure the locked state runs linearly, i.e. the torque opposed to the unlocking operation rises sharply during the unlocking operation as the angle of rotation increases. In order to increase the ease of operation, a flatter profile would be advantageous. For example, it is proposed in DE 196 33 782 C1 to use a helical buckling spring for securing the locked state of the fitting system. The characteristic of said spring runs virtually independently of the unlocking path, and therefore the force which is opposed to the unlocking operation and is to be overcome by the user remains virtually constant. In DE 100 38 778 B4, the user is assisted during the unlocking operation by a toggle lever which improves the expenditure of force.

SUMMARY OF THE INVENTION

The invention is based on the problem of improving a fitting system of the type mentioned at the beginning.

In a first embodiment of the invention, by means of the additional shaped spring which is installed in the fitting system in such a manner that the torque produced by said shaped spring follows a non-linear characteristic which is added to the at least approximately linear characteristic of the spring arrangement provided within the fitting to form the overall characteristic, the dependency of the torque to be applied by the user during the unlocking operation on the angle of rotation (of the transmission rod or of the hand lever) can be set. In comparison to purely linear spring characteristics, a completely different coordination of the torques in the locked and unlocked state can be set.

In a second embodiment of the invention, a resetting spring serves for resetting the deflected hand lever into a starting position. By means of the at least one shaped section of said resetting spring, the shaped section being designed and installed in the fitting system in such a manner that the torque produced by said shaped section follows a non-linear characteristic which is added to the at least approximately linear characteristic of a spring arrangement provided within the fitting to form an overall characteristic, the dependency of the torque to be applied by the user during the unlocking operation on the angle of rotation (of the transmission rod or of the hand lever) can be set. In comparison to purely linear spring characteristics, a completely different coordination of the torques in the locked and unlocked state can be set.

Since the minimum closing torque required has a decisive effect on the overall function (dynamic load absorption, play elimination, etc.) and the maximum ergonomic unlocking forces may not be of arbitrary size, a linear characteristic, for example of spiral springs, would generally result in structural contradictions and in limitations of the construction space. By contrast, a non-linear characteristic connected in parallel and having a decreasing profile can increase the minimum torques without raising the maximum torques to the same extent. An ergonomic unlocking operation is ultimately achieved in the outwardly effective sum of the individual spring torques. The subjective feeling of the user of producing a switching operation between "locked" and "unlocked" on actuation of the hand lever is preferred.

The shaped spring or the plurality of shaped springs of the first embodiment substantially consist of leaf-spring or wire-spring curved contours which, for their part, are in contact along curved contours of another component while the shaped spring moves relative to said other component. Since the combination of spring geometry and counter geometry ultimately determines both the magnitude of the spring force and the direction of action thereof, extremely varied torque/angle of rotation profiles (characteristics) can be constructed in purely geometrical terms, said profiles then, in sum with the effective linear characteristic of the resetting springs, permitting a desired profile of the unlocking force. Within the overall kinematic chain of the components involved in the unlocking operation, suitable possible positions of the shaped spring within the fitting system are all those positions at which, during the unlocking operation initiated by the user, there is a relative movement between a first component moved by the user and another, second component which is fixed relative thereto or is moved in a different manner. Consequently, a multiplicity of positions within and outside the fitting are suitable, with corresponding advantages and disadvantages for a standard component. Such a spring in the interior of the fitting, for example fixed to the fitting part and in contact with the eccentric, could generally change the characteristic (torque/angle of rotation profile) of the entire series of the fitting, but could just as readily be arranged outside the adjuster in the environment specific in each case to the customer or project in order, with different geometries, therefore also individually to realize individually different demands imposed on the characteristic.

The shaped section of the resetting spring of the second embodiment consists substantially of a curved contour, preferably a lug-shaped bulge, which, for its part, is in contact along a curved contour of another component while the resetting spring and said other component move relative to each other. Since the combination of spring geometry and counter geometry ultimately determines both the magnitude of the spring force and the direction of action thereof, extremely varied torque/angle of rotation profiles (characteristics) can be constructed in purely geometrical terms and then, in sum arrangement of the fitting, permit a desired profile of the unlocking force.

The fitting system according to the invention is preferably used in vehicle seats for adjusting the inclination of the back rest, but can also be used at other locations. The design of the fitting in the form of a disk-shaped unit permits arbitrary changes in the angle between the fitting parts by means of the relative rotation about the axis. The axial holding together of the fitting parts is preferably produced by a clasp ring.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

A plurality of exemplary embodiments of the invention are explained in more detail below with reference to drawings, in which.

DESCRIPTION OF THE PREFERRED EMBODIMENTS

Figure 1:
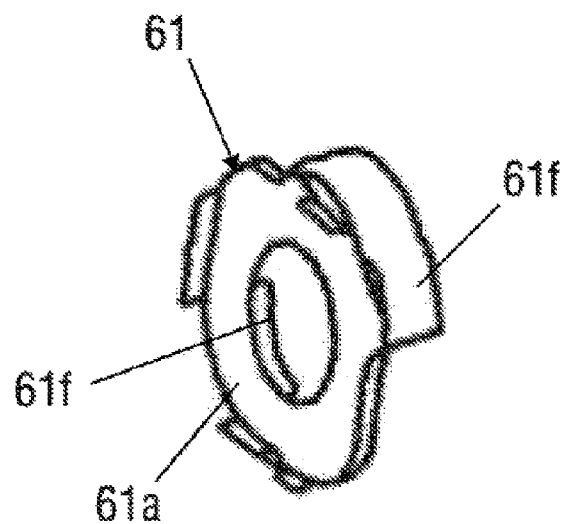
FIG. 1 is a perspective view of a shaped spring of a first exemplary embodiment.

Referring to the drawings in particular, a vehicle seat 1 for a motor vehicle has a seat part 3 and a back rest 4, the inclination of which is adjustable relative to the seat part 3. In order to adjust the inclination of the back rest 4, a transmission rod 7, which is arranged horizontally in the transition region between seat part 3 and back rest 4, is rotated manually, for example by means of a hand lever 5. On both sides of the vehicle seat 1, the transmission rod 7 engages in a fitting 10 with a substantially torsionally rigid connection or in a manner coupled thereto with a defined empty travel for driving purposes.

The fitting 10 has a first fitting part 11 and a second fitting part 12 which are rotatable relative to each other about an axis A. In the present case, the (imaginary) axis A is aligned with the transmission rod 7 and defines the direction indications used, which are those of a cylindrical coordinate system. The two fitting parts 11 and 12 can each be inscribed approximately into a circular disk shape. The two fitting parts 11 and 12 are preferably composed of metal, in particular steel, at least regions of which can be hardened. To absorb the axially acting forces, i.e. to axially hold the fitting parts 11 and 12 together, a clasp ring 13 is provided. The clasp ring 13 is preferably composed of metal, in particular steel, which is preferably unhardened. The clasp ring 13 preferably has a substantially flat annular shape, but, in an alternative embodiment, may be profiled in an L-shaped manner with a cylindrical section and a flat annular section on the end side.

The clasp ring 13 is fixedly connected to one of the two fitting parts 11 and 12, in the present case in an outer annular section to the second fitting part 12, for example by means of laser welding or by means of another fastening technique known per se. By means of an inner annular section which is arranged in a plane perpendicular to the axial direction, the clasp ring 13 engages, optionally with the interposition of a sliding ring, over the first fitting part 11 in the radially outer border region thereof without obstructing the relative movement of the two fitting parts 11 and 12. In addition, the mutually facing inner surfaces of the two fitting parts 11 and 12 are protected against the penetration of foreign bodies and dirt and against damage.

The clasp ring 13 and the fitting part 11 or 12 connected fixedly thereto therefore clasp the other of the two fitting parts 11 and 12, which is movable relative thereto. In terms of construction, therefore, the two fitting parts 11 and 12 together (with the clasp ring 13) form a disk-shaped unit.

With the mounting of the fitting 10, the first fitting part 11 is for example fixedly connected to the structure of the back rest 4, i.e. is fixed to the back rest. The second fitting part 12 is then fixedly connected to the structure of the seat part 3, i.e. is fixed to the seat part. However, the associations of the fitting parts 11 and 12 can also be swapped around, i.e. the first fitting part 11 would then be fixed to the seat part and the second fitting part 12 would be fixed to the back rest. The fitting 10 lies in the force flux between the back rest 4 and the seat part 3.

The fitting 10 is designed as a latching fitting, in which the first fitting part 11 and the second fitting part 12 are lockable to each other, as described, for example, in DE 20 2009 016 989 U1, the disclosure of which in this regard is expressly incorporated.

The second fitting part 12 has guide segments 14 in the present case four such segments—which guide respective locking bars 16 laterally in the radial direction in pairs by means of straight guide surfaces. The locking bars 16—of which there is a total of four in the present case—are arranged in such a manner as to be offset relative to one another—in the present case by 90° in each case in a construction space defined between the two fitting parts 11 and 12. The locking bars 16 are provided at the radially outer end thereof with a toothing 16 z, which can engage with (enter) a toothed ring 17 of the first fitting part 11, which is designed as an internal gear. When the toothed ring 17 and the locking bars 16 interact, the fitting 10 is locked.

The first fitting part 11 is arranged in a depression in the second fitting part 12, and the latter engages over said first fitting part radially on the outside, with the result that the two fitting parts 11 and 12 support each other. In this case, the radially outer border region of the first fitting part 11 is arranged with the toothed ring 17 in the radial direction between the guide segments 14 and the radially outer border region of the second fitting part 12 (said border region serving to support the first fitting part 11). Under high loads, for example in the event of a crash, the first fitting part 11—after a deformation—can come into contact by means of the toothed ring 17 thereof with the guide segments 14, which are closer in the direction of load and have correspondingly (concentrically) curved surfaces in the direction of the toothed ring 17. This increases the strength of the fitting 10.

The first fitting part 11 can be mounted in the second fitting part 12. However, the conditions could be exactly the other way around, i.e. the second fitting part 12 can be mounted on the first fitting part 11. In principle, however, both arrangements are equivalent.

A driver 21, for example composed of plastic, is arranged in the center of the fitting 10 and is supported rotatably on at least one of the two fitting parts 11 and 12, in the present case the first fitting part 11, more precisely in a central opening thereof. On both sides of the vehicle seat, the driver 21 is connected in a torsionally rigid manner or at least coupled for driving purposes to the transmission rod 7, which is introduced into a bore 23 of the hollow driver 21. At one end of the driver 21, in the present case that at the second fitting part 12, a fastening ring 24 is provided, said ring being composed of plastic in the present case and preferably being fastened to the driver 21 by means of ultrasonic welding. The hand lever 5 can be firmly clipped to the fastening ring 24 in a torsionally rigid manner.

An eccentric 27, which is arranged in the construction space defined between the fitting parts 11 and 12, is seated in a torsionally rigid manner or is at least coupled for driving purposes on the driver 21. A spring arrangement 35, for example one or two spiral springs nested one in the other, is arranged in a central receptacle of one of the two fitting parts 11 and 12, in the present case of the second fitting part 12, and, in the present case, is supported on the outside. The spring arrangement 35 acts upon the eccentric 27, in the present case by being seated in a torsionally rigid manner on the driver 21 on the inside. A spring arrangement 35 of this type is described, for example, in DE 20 2009 016 989 U1, which is already mentioned above, or in DE 10 2005 046 807 B3, the disclosure of which in this regard is expressly incorporated. The eccentric 27 which is acted upon by the spring arrangement 35 acts on the radially movable locking bars 16 and acts upon the latter in such a manner that they are pushed radially outward in order to enter the toothed ring 17, thus locking the fitting 10.

A control disk 36 is arranged in the construction space axially between the locking bars 16 and the first fitting part 11 and is seated on the eccentric 27, in the present case in a torsionally rigid manner. The control disk 36 has control tracks—in the present case four such tracks—each of which interacts with a lug 38 on each locking bar 16. The lugs 38 project in the axial direction from the locking bars 16 associated therewith. Upon rotation (of a few degrees) of the driver 21—and of the eccentric 27, which is driven therewith, and of the control disk 36—counter to the force of the spring arrangement 35, the control disk 36 pulls the locking bars 16 radially inward, i.e. out of the toothed ring 17, with the result that the fitting 10 is unlocked and the two fitting parts 11 and 12 are rotatable relative to each other about the axis A. The back rest 4 is now pivotable about the axis A, in order to adjust the inclination thereof, i.e. in order to take up a different use position.

In the case of motor vehicles with two doors, the intention is to facilitate access to a rear row of seats by pivoting the back rest 4 free, for which purpose the unlocked back rest 4 is pivoted forward out of one of the use positions into a position in which it has been pivoted free and which is not suitable for use as a seat. The ease of operation is increased if the hand lever 5—or a further actuating element—does not have to be held during the entire pivoting-free process and the fittings nevertheless lock only in the position in which the back rest has been pivoted free. For this purpose, an annular pivot-free control element 45 is optionally provided in the fitting 10 around the axis A, between the control disk 36 and the first fitting part 11, as is described, for example, in DE 10 2006 015 560 B3, the disclosure of which in this regard is expressly incorporated.

Figure 10:
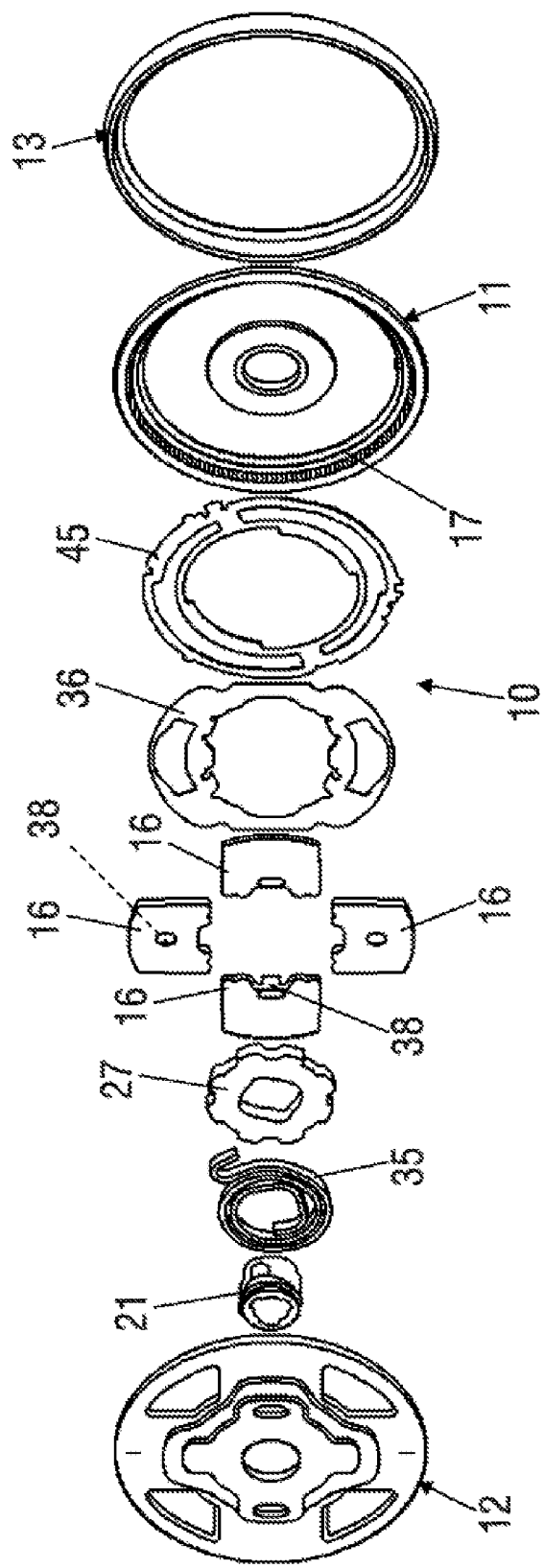
FIG. 10 is an exploded illustration of a fitting without an illustration of the shaped spring.
Figure 11:
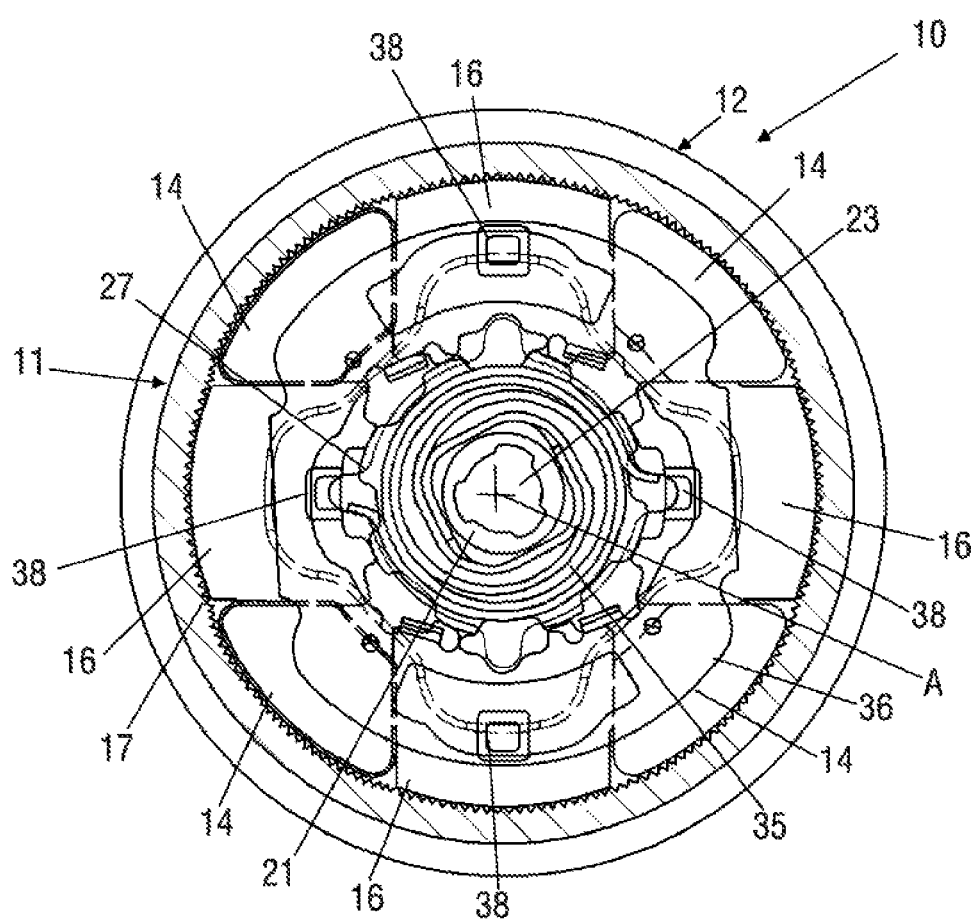
FIG. 11 is a radial section through the fitting along line XI-XI in FIG. 12.
Figure 12:
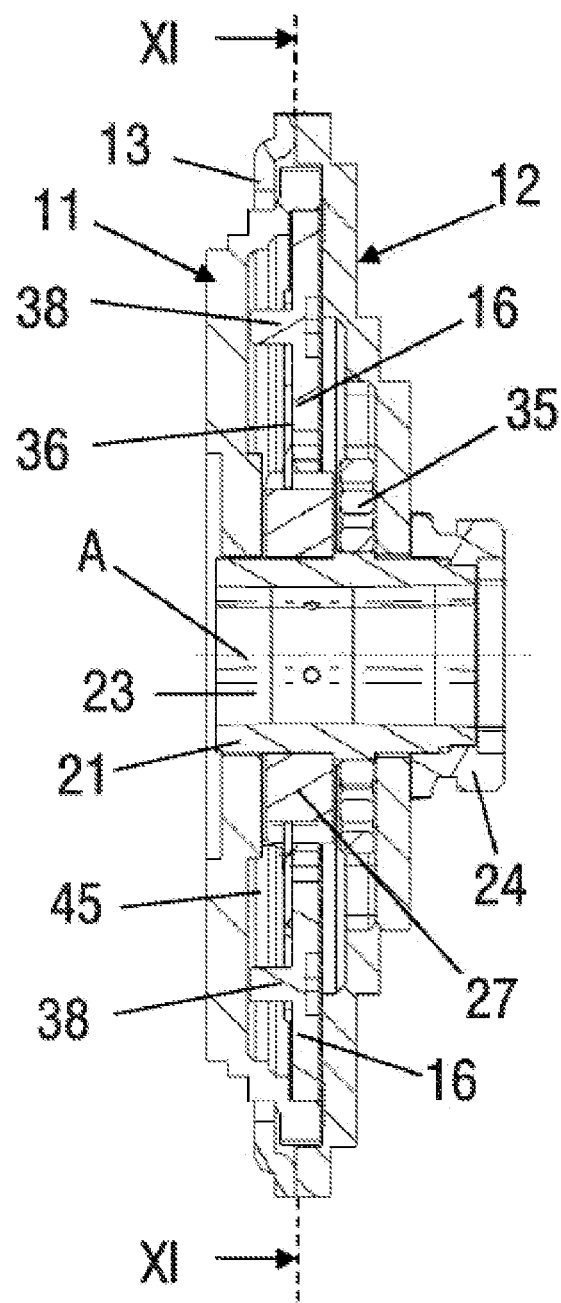
FIG. 12 is an axial section through the fitting.
Figure 19:
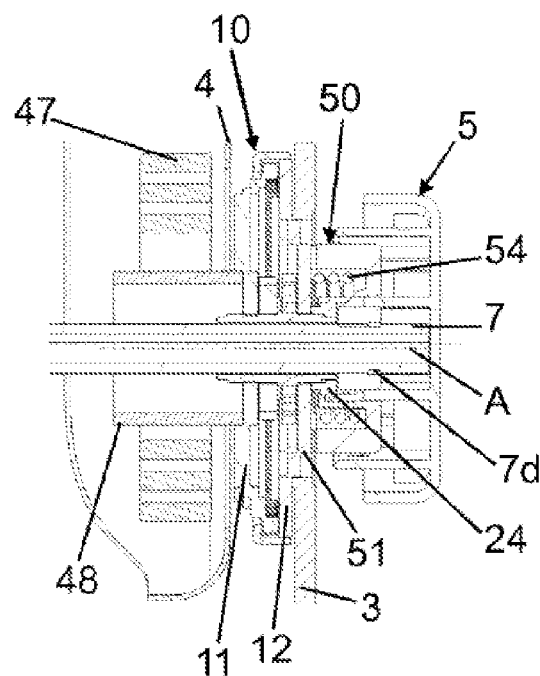
FIG. 19 is an axial section through the fitting, stop module, hand lever and back rest compensation spring of the second exemplary embodiment.

The two fittings 10, the transmission rod 7 and the hand lever 5 are parts of a fitting system, to which generally at least one back rest compensation spring 47, preferably two back rest compensation springs 47 which are each arranged on one of the two fittings 10 and are supported, for example, on a supporting bushing 48, also belongs. The hand lever 5 can be of single-part or multi-part design, for example with a handle part and a hub part. A stop module 50 is preferably arranged between the hand lever 5 and the transmission rod 7, as described, for example, in DE 20 2010 015 171 U1, the disclosure of which is expressly incorporated, and which also describes how the supporting bushing 48 is fastened to the fitting 10. The stop module 50 has a plurality of functions. It transmits the torque from the hand lever 5 actuated by the user to the transmission rod 7. The stop module 50 limits the angular range for the actuation of the hand lever 5 in at least one direction of rotation of the hand lever by coming to stop against at least one counter stop 51 on the fitting 10 (FIG. 10, FIG. 19) or on the supporting bushing 48 (FIG. 20 to FIG. 24), which also serves as protection against misuse. The stop module 50 eliminates rattle in the fitting system by preventing, by means of a resetting spring 54, a relative movement of the transmission rod 7, for example with respect to the driver 21, wherein the force of the resetting spring is very much smaller than that of the spring arrangement 35. The stop module 50 also defines the hand-lever end position opposite the stop.

Figure 5:
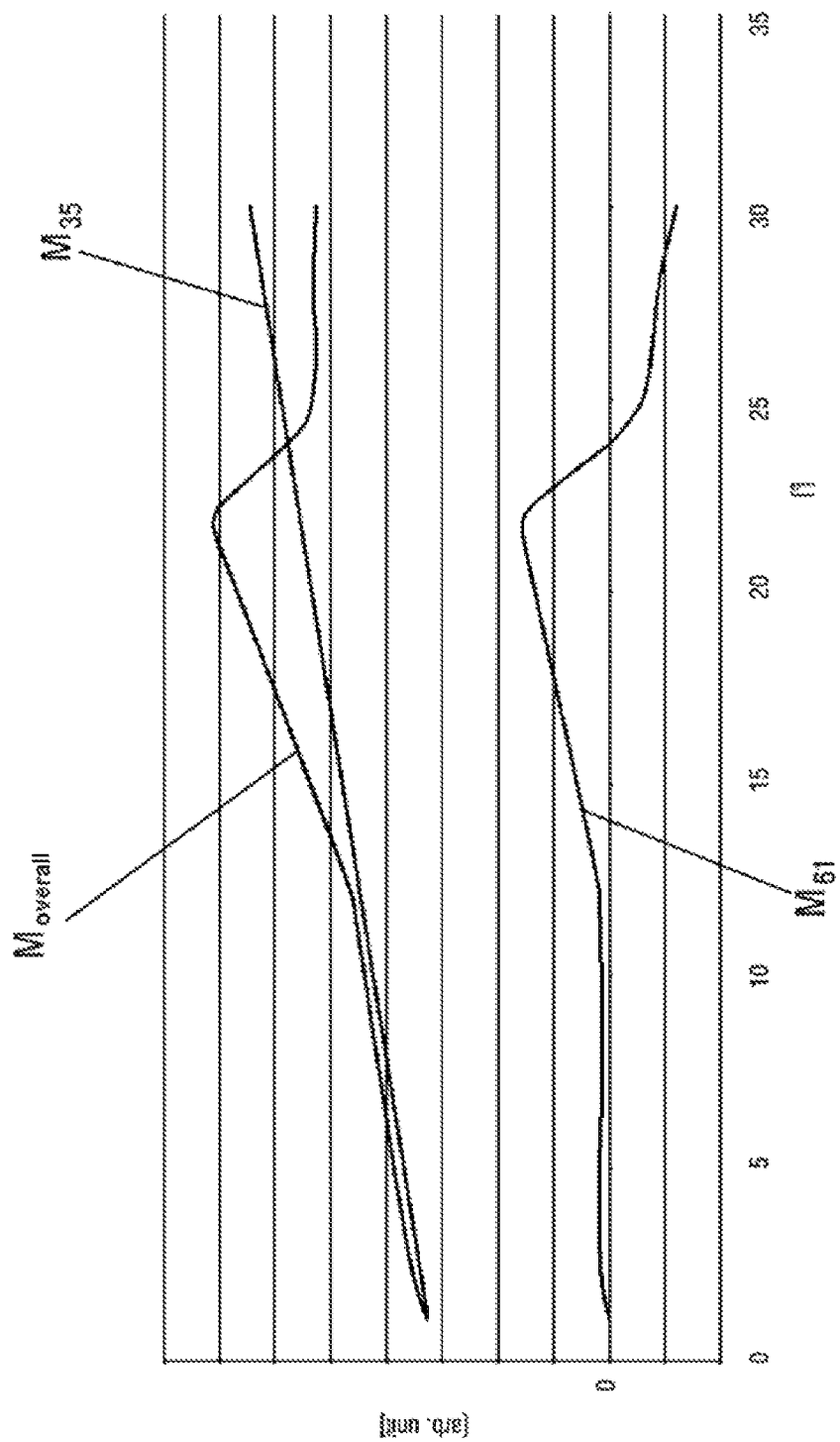
FIG. 5 is a characteristic diagram of the unlocking torque over the unlocking angle of the first exemplary embodiment.

In the first exemplary embodiment, during the unlocking operation of the fitting system, the user has to overcome the force of the respective spring arrangement 35 in the two fittings 10. In order subjectively to produce the feeling of switching between "locked" and "unlocked", a non-linear characteristic $M_{overall}$ (unlocking torque/unlocking angle of rotation) of all of the spring forces acting during the actuation of the hand lever 5 is desirable. According to the invention, a shaped spring 61 which produces a torque with a non-linear characteristic $M_{61}$ is provided for this purpose. Said non-linear portion of the shaped spring 61 is added to the substantially (i.e. at least approximately) linear characteristic $M_{35}$ of the torque produced by the two spring arrangements 35 (and a possible resetting spring of the stop module 50), thus producing the desired profile of the overall characteristic $M_{overall}$, as illustrated in FIG. 5 with the unlocking torque over the unlocking angle. The characteristic $M_{61}$ of the torque produced by the shaped spring 61 preferably initially rises slightly or runs at a low level, i.e. the shaped spring 61 first of all acts counter to the unlocking operation. The characteristic $M_{61}$ of the shaped spring 61 then falls, i.e. the shaped spring 61 facilitates—subjectively—the further unlocking operation. The characteristic $M_{61}$ of the torque produced by the shaped spring 61 finally optionally falls below the zero line, i.e. the characteristic then assists the unlocking operation. By means of the precise design of the shaped spring 61, it is possible, in sum with the linear characteristic $M_{35}$ of the spring arrangements 35, to construct widely varying characteristics $M_{overall}$ in order to produce the desired dependency of the torque to be applied by the user in dependence on the angle of rotation.

Figure 6:
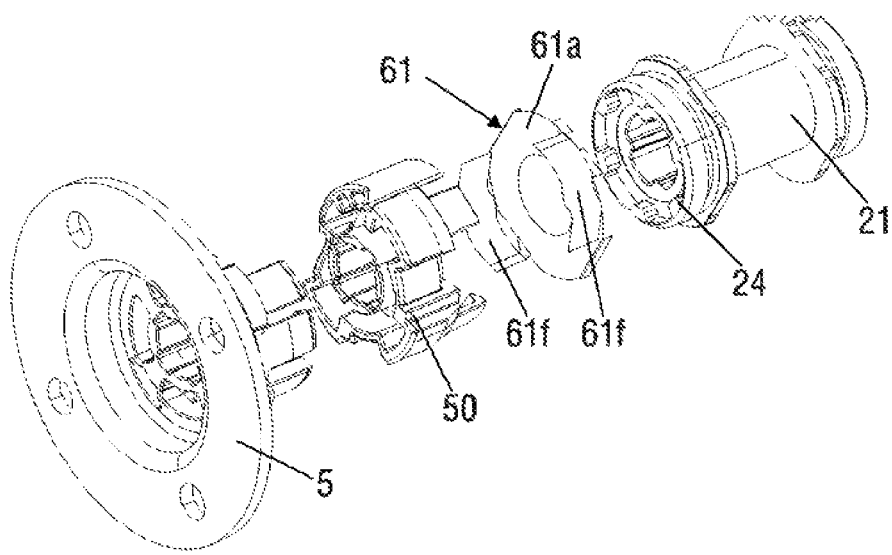
FIG. 6 is a perspective partial view of a first version of the first exemplary embodiment, wherein the hand lever is illustrated without a handle part.
Figure 7:
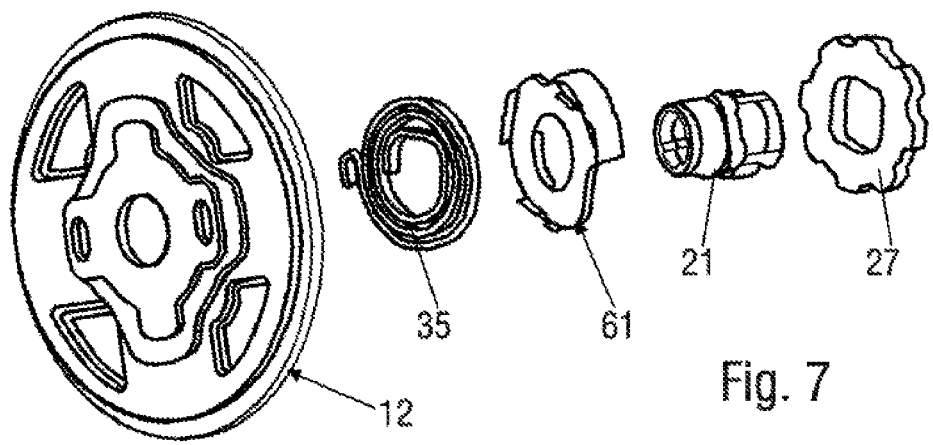
FIG. 7 is a perspective partial view of a second version of the first exemplary embodiment.
Figure 8:
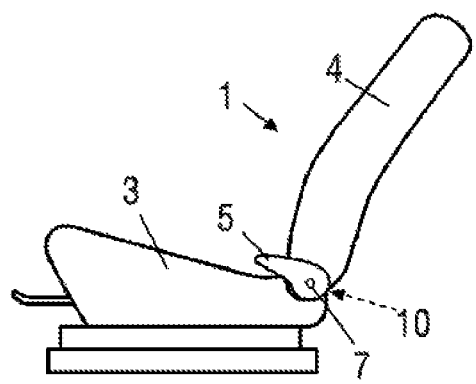
FIG. 8 is a schematic illustration of a vehicle seat.
Figure 9:
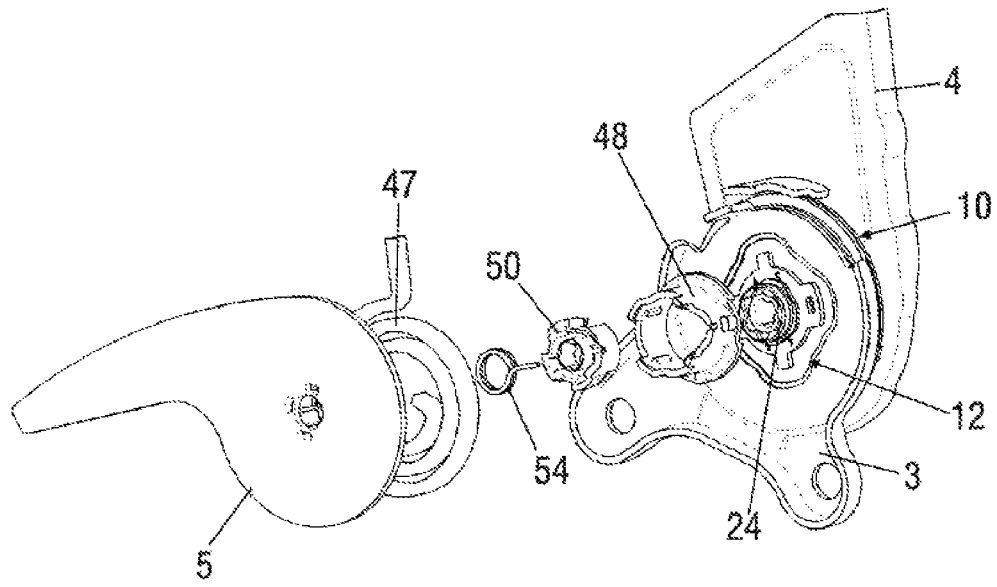
FIG. 9 is a perspective view of the first exemplary embodiment without an illustration of the shaped spring.

The shaped spring 61 acts between two components of the fitting system, which are referred to as the first component 63 and as the second component 64 and which move, in particular rotate, relative to each other during the unlocking operation of the fitting system. The shaped spring 61 ultimately acts parallel to the respective spring arrangement 35 with regard to the spring forces. The first component 63 is, for example, the hand lever 5, the stop module 50, the transmission rod 7, the driver 21 or the eccentric 27, or a component connected in a torsionally rigid manner thereto. The second component 64 is, for example, one of the two fitting parts 11 or 12, the pivot-free control element 45 or the supporting bushing for the back rest compensation spring. FIG. 6 shows a first version of an exemplary arrangement of the shaped spring 61 with the stop module 50 as the first component 63 and the supporting bushing 48, which is fastened to the second fitting part 12 and supports the back rest compensation spring, as the second component. This external arrangement of the shaped spring 61 with respect to the fitting 10 can easily be adapted to customer requirements. FIG. 7 shows a second version of an exemplary arrangement of the shaped spring 61 with the second fitting part 12 as the first component 63 and the eccentric 27 as the second component 64. This internal arrangement of the shaped spring 61 with respect to the fitting 10 saves on construction space. The internal arrangement can be modified to a torsionally rigid connection of the shaped spring 61 with respect to the pivot-free control element 45 as the second component 64, and therefore different characteristics can be set for the inclination-adjustment and the pivot-free region.

The shaped spring 61 is preferably produced integrally from spring steel. The shaped spring 61 has a basic body 61a which is, for example, of annular design and is arranged concentrically with respect to the axis A. The basic body 61a is connected in a torsionally rigid manner to the first component 63, for example by means of a matching inner or outer contour. The shaped spring 61, furthermore, has at least one spring arm 61f which protrudes from the basic body 61a. In the present case, the spring arm 61f has a section which protrudes axially from the basic body 61a and continues into a section of the spring arm 61f, which section runs in the circumferential direction of the axis A and then ends at a free end of the spring arm 61. Two (or more) spring arms 61f are preferably provided, said spring arms being identical to one another and being arranged on the basic body 61a uniformly in the circumferential direction with respect to the axis A such that the bearing forces cancel one another out and no additional friction forces arise in the mounting. The spring arms 61f provided bear (resiliently) against the second component 64.

Figure 2:
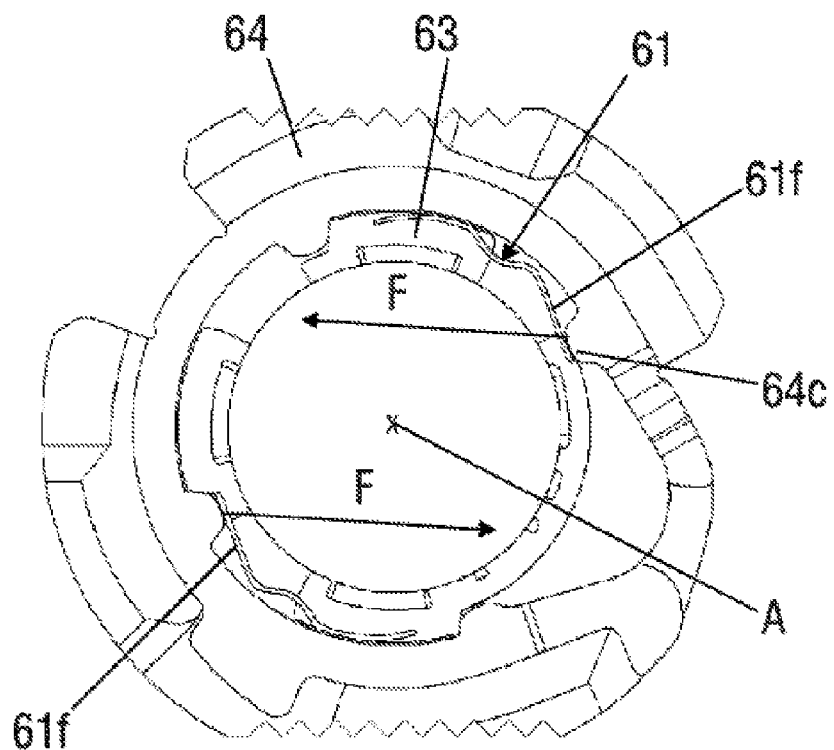
FIG. 2 is a partial view of the first exemplary embodiment in the locked starting position.

FIG. 2 shows by way of example a section through the second component 64, the first component 63 and the shaped spring 61 in the locked starting position, i.e. when the fitting system is locked. The shaped spring 61 is connected in a torsionally rigid manner to the first component 63 and is (at least partially) enclosed in the radial direction by the second component 64. The spring arms 61f of the shaped spring 61 bear in each case at a contact point against a contour 64c of the second component 64. The contours 64c project radially toward the shaped spring 61, i.e. radially inward, and therefore the spring arms 61f are deflected, i.e. the shaped spring 61 is prestressed. The forces F arising at the respective contact points of the spring arms 61f having the contours 64c are indicated in the drawing. The direction and magnitude of said forces depend on the spring stiffness and the tangent at the contact point. In the starting position, the forces F arising because of the contact produce a closing torque about the axis A, said torque acting in a left-rotating manner in the drawing.

Figure 3:
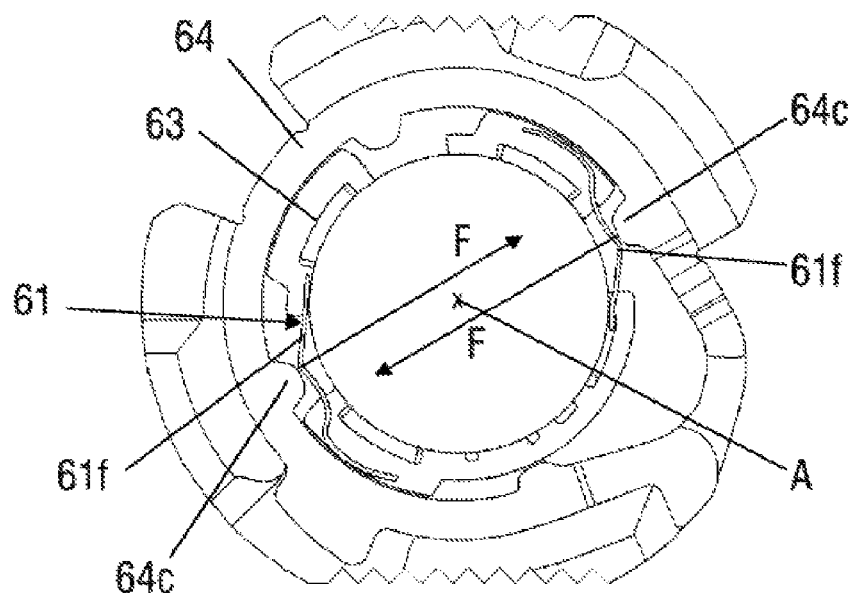
FIG. 3 is the view of FIG. 2 in an intermediate position of the unlocking operation.
Figure 4:
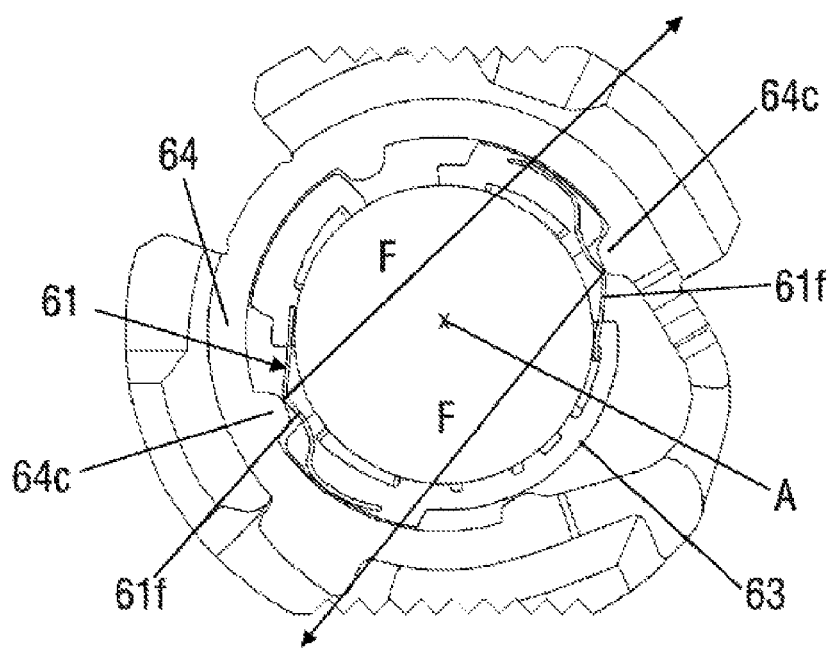
FIG. 4 is the view of FIG. 2 in the unlocked end position.

FIG. 3 shows an intermediate position after the first component 63 is rotated in the clockwise direction for the unlocking operation. The spring arms 61f have, approximately centrally, a section running in an S-shaped manner. As soon as said section comes into contact with the respective contour 64c, the deflection of the respective spring arm 61f, the position of the contact point and the direction of the tangent change, for example in such a manner that the forces F give rise to a small torque about the axis A, the torque acting in an opening manner, i.e. being right-rotating in the drawing. FIG. 4 shows the unlocked end position with a further shift in the contact point and in the direction of the tangent because of the section of the spring arms 61f running in an S-shaped manner, and therefore the forces F lead to a large opening torque.

Figure 13:
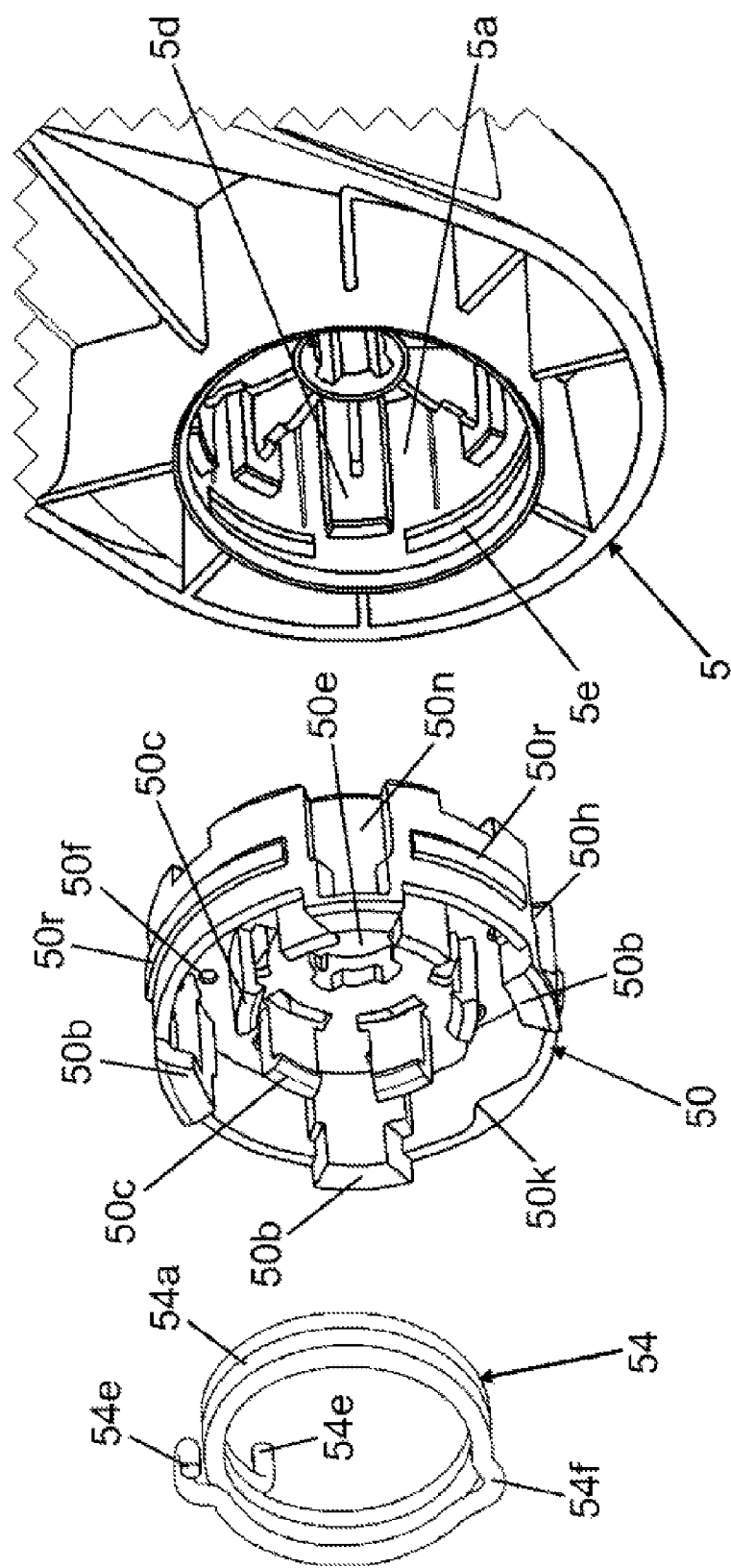
FIG. 13 is an exploded illustration of the resetting spring, stop module and hand lever of a second exemplary embodiment.

In the second exemplary embodiment, the stop module 50 (FIG. 13) is of cup-shaped design, preferably in the form of a plastics injection-molded part. The open side of the stop module 50 faces the second fitting part 12, and said stop module is aligned with the axis A. On the open side of the stop module 50, the border of the cylindrical wall of the stop module 50 is designed in the manner of a crown by a plurality of stops 50b, in the present case four such stops, which are integrally formed (i.e. are formed integrally with the stop module 50) projecting axially along the border, the stops interacting with said counter stops 51 on the fitting 10, preferably with a star-shaped shoulder on the second fitting part 12 (FIG. 10, FIG. 19), or on the supporting bushing 48

(FIGS. 20 to 24). The four stops 50b here are arranged between the counter stops 51 with a large degree of play in the circumferential direction, for example 30°. A plurality of clip hooks 50c, in the present case six such clip hooks, project axially from the interior of the stop module 50 and are arranged concentrically with respect to the stops 50b. The clip hooks 50c engage behind the fastening ring 24 in the axial direction, thereby forming a clip connection, as a result of which the stop module 50 is connected rotatably to the fitting 10 (on the outside thereof).

Figure 14:
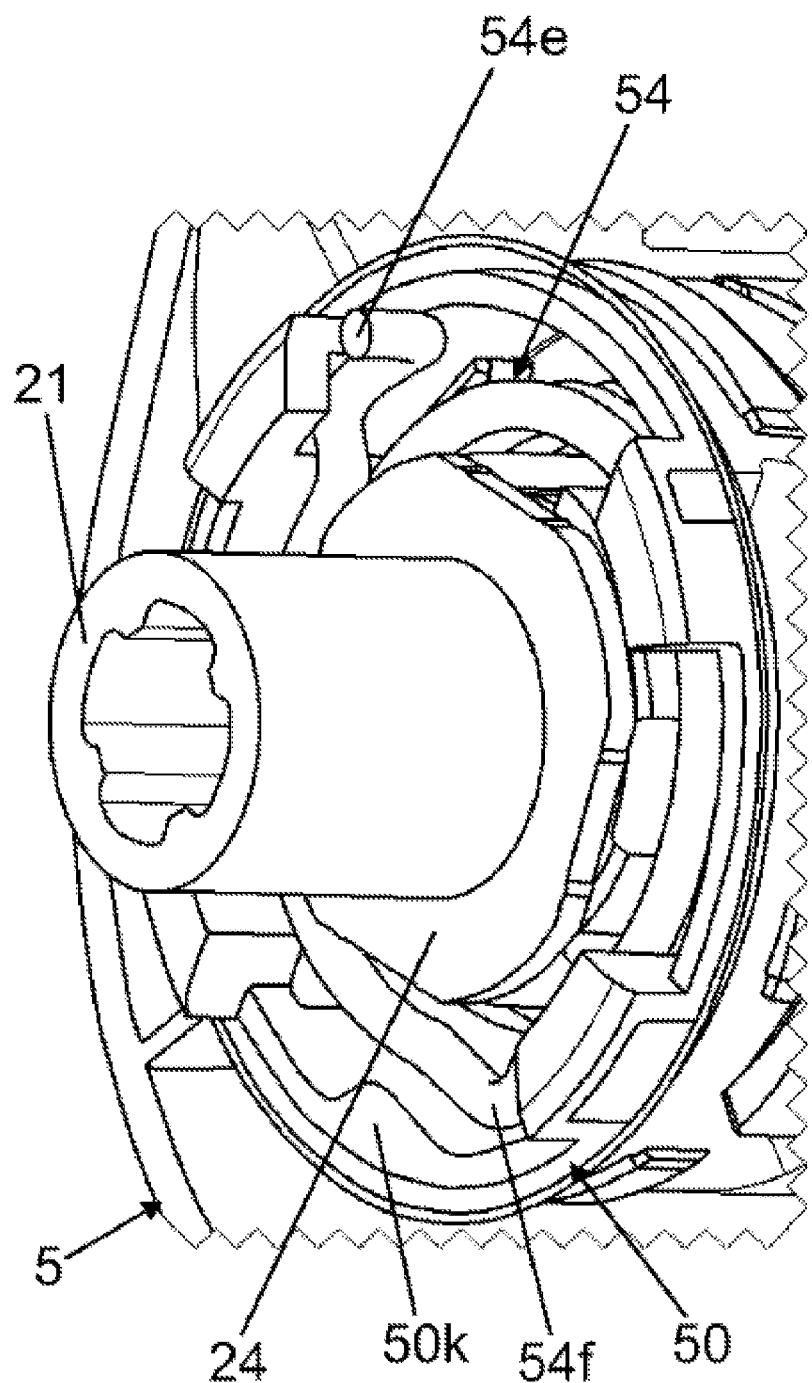
FIG. 14 is a perspective partial view of the driver, resetting spring, stop module and hand lever of a second exemplary embodiment.
Figure 15:
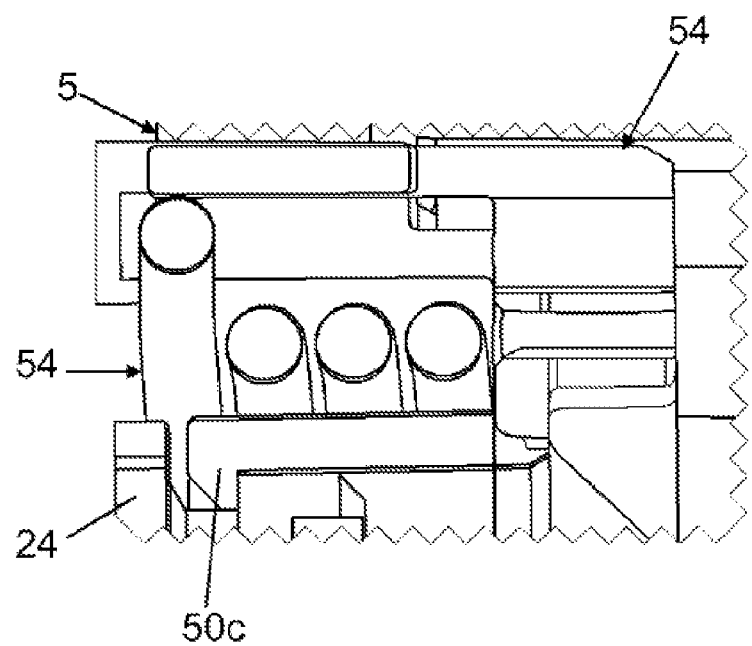
FIG. 15 is an axial section through a part of FIG. 14.

The resetting spring 54 (FIG. 13) is preferably formed from spring wire. It has a helically coiled basic body 54a and two spring ends 54e. The two spring ends 54e are bent over and project axially (in opposite directions) from the basic body 54a. The resetting spring 54 is accommodated by the stop module 50, said resetting spring being arranged radially between the wall of the cup-shaped stop module 50 and the clip hooks 50c (FIG. 14, FIG. 15). The two spring ends 54e are shaped in such a manner that the resetting spring 54 can easily be preassembled in the stop module 50 in a parking position. For this purpose, the resetting spring 54 is inserted in a tension-free manner into the stop module 50. The resetting spring 54 is tensioned (in the circumferential direction and axially), specifically somewhat further than the parking position, and is then released. In the process, the resetting spring 54 relaxes to an extent such that it comes to lie in the parking position, thus being secured for the continued assembly.

The second fitting part 12 has a holder which is designed as a pin which projects into the construction space in the interior of the fitting 10 and the reverse side of which has an outwardly open blind hole. The blind hole can be formed as part of the production process during the formation of the pin. In the interior of the fitting 10, the holder serves for fastening the spring arrangement 35. On the outside of the second fitting part 12, the holder 12h serves for hooking in (i.e. fastening) one of the two spring ends 54e of the resetting spring 54.

An opening 50e is provided in the bottom of the stop module 50, i.e. the (largely) closed end side thereof, said opening being designed as a through opening in the axial direction and being arranged concentrically with respect to the cylindrical wall having the stops 50b and with respect to the clip hooks 50c. The profiled opening 50e accommodates the transmission rod 7 in a torsionally rigid manner. A plurality of spring anchorage points 50f distributed uniformly in the circumferential direction, in the present case eight such spring anchorage points, which are designed so as to pass axially through the bottom of the stop module 50, are arranged concentrically with respect to the opening 50e. The other of the two spring ends of the resetting spring 54 is inserted (and therefore fastened) in one of said spring anchorage points 50f.

A plurality of grooves 50n, in the present case four such grooves, which run in the axial direction and open at one end on the base of the stop module 50 are formed radially on the outside of the cylindrical wall of the stop module 50. In the present case, the grooves 50n are aligned with the stops 50b. In the circumferential direction between the grooves 50n, a plurality of latching lugs 50r, in the present case four such latching lugs, are formed on the cylindrical wall of the stop module 50.

The hand lever 5 (FIG. 13) is preferably composed of plastic and, in the second exemplary embodiment, is designed as a single-piece component. The hand lever 5 has (as a subregion) a receptacle 5a into which the stop module 50 is introduced (in the axial direction) when the hand lever 5 is mounted on. The receptacle 5a then accommodates most of the stop module 50. The receptacle 5a is bounded by a wall on which a plurality of long ribs 5d, in the present case four such ribs, which run in the axial direction are formed. When the hand lever 5 is mounted onto the stop module 50, the ribs 5d are inserted (in an interlocking manner) into the grooves 50n. The hand lever 5 and the stop module 50 are thereby connected to each other in a torsionally rigid manner in the circumferential direction, thus permitting transmission of torques. Optionally, (further) axial projections are formed on the hand lever 5 and depressions on the stop module 50, said projections and depressions additionally providing an interlocking connection between the hand lever 5 and the stop module 50.

Furthermore, a plurality of latching depressions 5e, in the present case four such latching depressions, which extend spaced apart from one another in the circumferential direction and one behind another, are formed in the wall of the receptacle 5a. As the hand lever 5 is mounted on the stop module 50, the latching lugs 50r enter the latching depressions 5e, thereby forming a clip-type connection, i.e. the leading border of each latching depression 5e in the direction of mounting engages behind the associated latching lug 50r. The hand lever 5 is thereby secured on the stop module 50 in the axial direction. The resilience of the stop module 50 and of the hand lever 5 are sufficient to ensure that the latching lugs 50r cover the distance between the border on the end side of the wall of the receptacle 5a and the latching depression 5e.

The transmission rod 7 preferably has clamping cams 7d, which project slightly in the radial direction and are formed, for example, by a local deformation (squeezing) of the transmission rod 7. The clamping cams 7d interact with the border of the opening 50e of the stop module 50 by clamping the transmission rod 7 firmly on the stop module 50 in the axial direction, i.e. securing said transmission rod axially by frictional engagement (and with slight positive engagement), in addition to the torsionally rigid connection in the circumferential direction. The transmission rod 7 is then secured against being pushed into the fitting 10, i.e. into the driver 21. The hand lever 5, with which the transmission rod 7 comes into contact in the axial direction, also prevents the transmission rod 7 from being pushed out of the fitting 10.

During the unlocking operation of the fitting system, the user has to overcome the force of the respective spring arrangement 35 and of the resetting spring 54 in both fittings 10. In order subjectively to produce the feeling of switching between "locked" and "unlocked", a non-linear characteristic $M_{overall}$ (unlocking torque/unlocking angle of rotation) of all of the spring forces acting during the actuation of the hand lever 5 is desirable.

Figure 18:
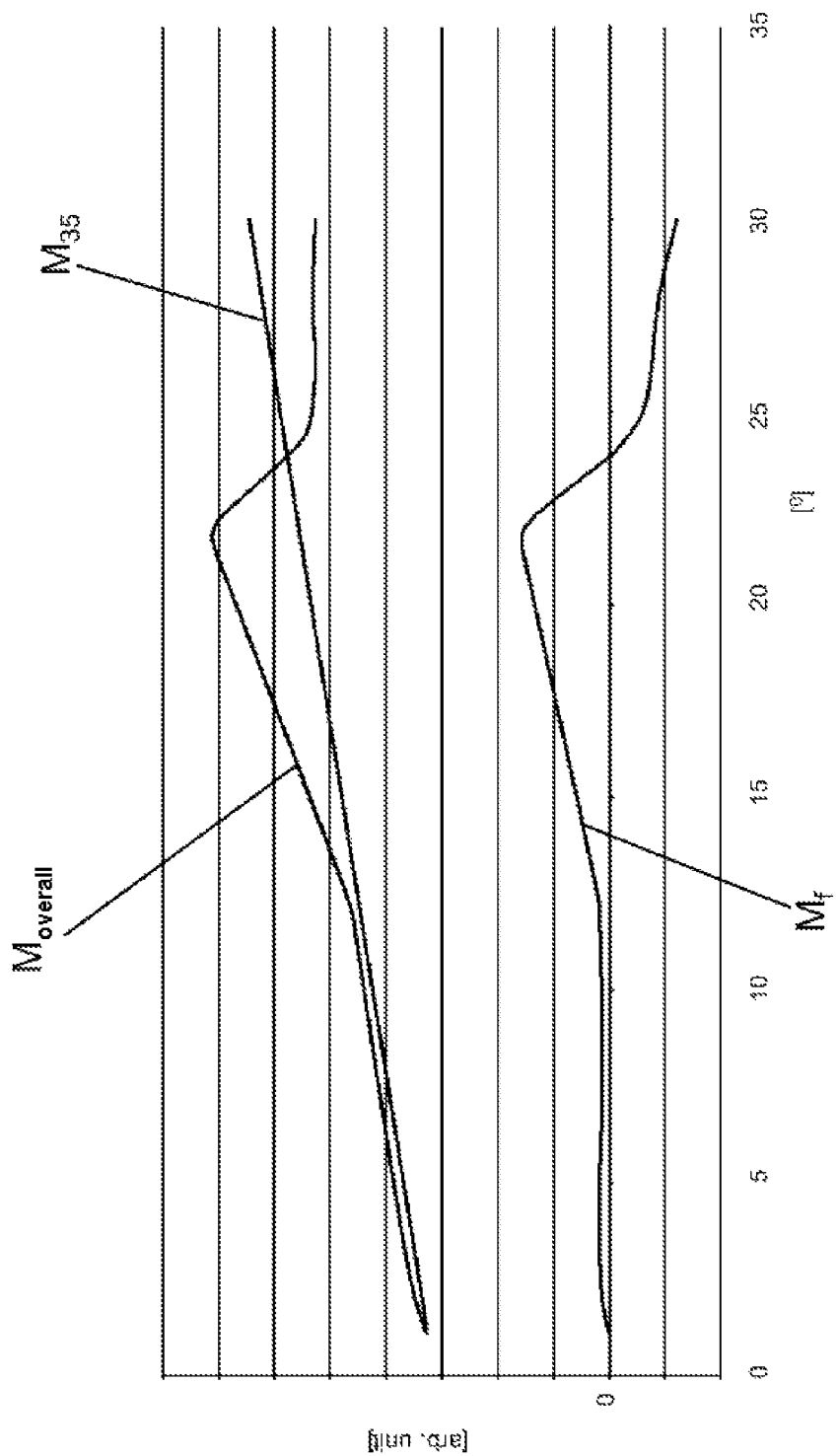
FIG. 18 is a characteristic diagram of the unlocking torque over the unlocking angle of the second exemplary embodiment.

In the second exemplary embodiment, the resetting spring 54 has at least one shaped section 54f, in the present case precisely one shaped section 54f. During the unlocking operation, the resetting spring 54 interacts by means of said shaped section 54f in a specific manner with the stop module 50 and thus temporarily produces a torque having a non-linear characteristic $M_f$. Said non-linear portion is added to the substantially (i.e. at least approximately) linear characteristic $M_{35}$ of the torque produced by the spring arrangements 35 of the two fittings 10 (and optionally to the linear portion of the resetting spring 54), thus producing the desired profile of the overall characteristic $M_{overall}$, as illustrated in FIG. 18 with the unlocking torque over the unlocking angle. The characteristic $M_f$ of the torque produced by the resetting spring 54, by means of the shaped section 54f thereof, preferably initially rises slightly or runs at a low level, i.e. the shaped section 54*f* of the resetting spring 54 initially acts counter to the unlocking operation. The characteristic $M_f$ of the torque produced by the shaped section 54*f* then drops, i.e. the resetting spring 54 facilitates—subjectively—the further unlocking operation. The characteristic $M_f$ of the torque produced by the shaped section 54*f* finally optionally falls below the zero line, i.e. said characteristic then assists the unlocking operation. By means of the precise design of the shaped section 54*f*, it is possible, in sum with the linear characteristic $M_{as}$, to construct greatly varying characteristics $M_{overall}$ in order to produce the desired dependency of the torque which is to be applied by the user in dependence on the angle of rotation.

The shaped section 54*f* is formed at that end of the resetting spring 54 which faces the fitting 10, specifically in the final coil of the basic body 54*a*. The spring wire of which the resetting spring 54 is composed runs in the circumferential direction in the basic body 54*a* (and by one spring wire diameter per coil in the axial direction). The shaped section 54*f* is a radial bulge of the spring wire in the form of a lug, at which the spring wire bends away radially outward (obliquely) in a first part, turns around and runs radially inward (obliquely) again in a second part. That part of the lug-shaped bulge which is positioned closer to the spring end 54*e* has a somewhat longer size in the circumferential direction and is at a smaller angle with respect to a tangential profile ("back of the lug") than the adjoining part. The bulge can also be provided radially inward. In the event of a plurality of shaped sections 54*f*, the latter are arranged uniformly in the circumferential direction. In the second exemplary embodiment with precisely one shaped section 54*f*, the shaped section 54*f*, in the final coil of the basic body 54*a*, is formed radially opposite the spring end 54*e* with respect to the axis A.

For interaction with the shaped section 54*f*, the stop module 50 for the shaped section 54*f* has an associated contour 50*k* which is preferably a projection which has a lug-shaped profile and extends in the form of a rib in the axial direction. In the second exemplary embodiment with the shaped section 54*f* which bulges radially outward, the contour 50*k* is formed radially on the inside of the cylindrical wall of the stop module 50. As viewed in the circumferential direction, the contour 50*k* runs radially inward (obliquely) in a first part, then turns around and runs radially outward (obliquely) again in a second part. The part facing the shaped section 54*f* has a longer size ("back of the lug") in the circumferential direction than the part facing away therefrom.

Figure 16:
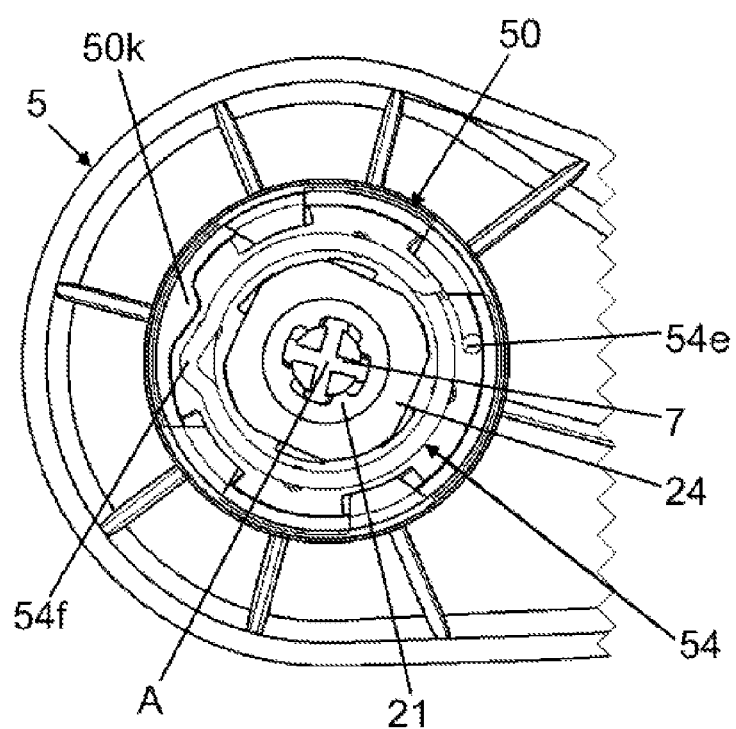
FIG. 16 is an interior view of the driver, resetting spring, stop module and hand lever of a second exemplary embodiment.
Figure 17A:
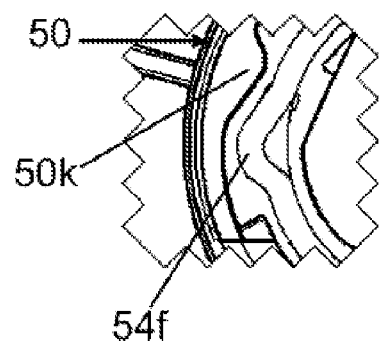
FIG. 17A is an enlarged detail of FIG. 16 in the locked starting position.
Figure 17B:
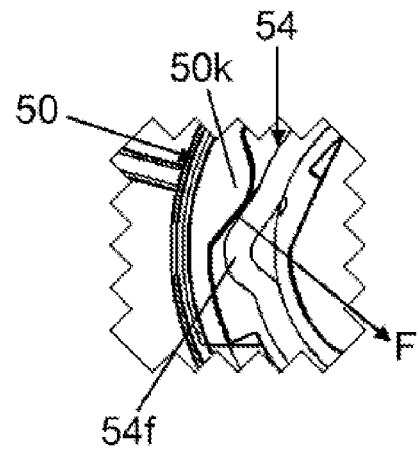
FIG. 17B is a detail corresponding to FIG. 17A in an intermediate position of the unlocking operation.
Figure 17C:
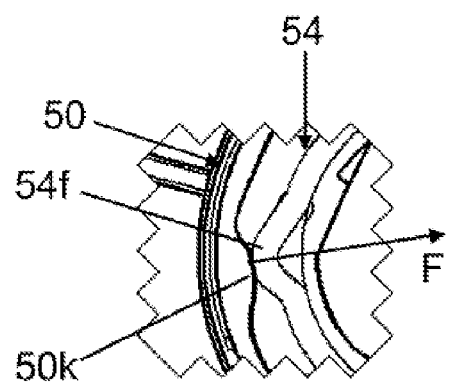
FIG. 17C is a detail corresponding to FIG. 17A in the unlocked end position.

The shaped section 54*f* is initially free and spaced apart from the contour 50*k* in the circumferential direction (FIG. 16, FIG. 17A) such that it has a small effect only as part of the basic body 54*a*. When the hand lever 5, and therefore the stop module 50, begin to be deflected out of the starting position about an unlocking angle, the contour 50*k* rotates relative to the shaped section 54*f* of the resetting spring 54 and, in the process, approaches said shaped section. As soon as, after a certain unlocking angle, the contour 50*k* comes into contact with the shaped section 54*f* assigned thereto (and specifically in each case at the "backs of the lugs"), the shaped section 54*f* is deflected (radially), as a result of which a force F is produced in the respective contact point (FIG. 17B). The force ratios for the resetting spring 54 change because of the deflected shaped section 54*f*. Depending on the deflection of the shaped section 54*f*, the position of the contact point and the direction of the tangent, the force F first of all produces a small closing torque about the axis A, i.e. the characteristic $M_f$ rises. Owing to the profile of the contour 50*k* and of the shaped section 54*f*, the force F changes the direction thereof relative to the axis A, and therefore the torque changes the direction of rotation thereof, i.e. the characteristic $M_f$ drops. The size of the torque $M_f$ increases, and therefore the force F at the contact point leads to a large opening torque (FIG. 17C).

Various modifications in respect of the shaped section 54*f* are possible. The shaped section 54*f* could have a radially inward bulge and could interact with a correspondingly radially outwardly projecting contour 50*k* of the stop module 50.

Furthermore, the at least one shaped section 54*f* can be formed on a separate spring, a shaped spring. Although there would therefore be an additional component, said shaped spring could be effective therefor by means of the at least one shaped section 54*f* between two components of the fitting system, which components move, in particular rotate, relative to each other during the unlocking operation of the fitting system. With regard to the spring forces, said shaped spring ultimately acts parallel to the respective spring arrangement 35. The first component is, for example, the hand lever 5, the stop module 50, the transmission rod 7, the driver 21 or the eccentric 27 or a component connected in a torsionally rigid manner thereto. The second component is, for example, one of the two fitting parts 11 or 12, the pivot-free control element 45 or the supporting bushing 48 for the back rest compensation spring 47. An external arrangement of the shaped spring with respect to the fitting 10 can easily be adapted to customer requirements. An internal arrangement of the shaped spring with respect to the fitting 10 saves on construction space. The internal arrangement can be modified to a torsionally rigid connection of the shaped spring with respect to the pivot-free control element 45 as the second component, and therefore different characteristics can be set for the inclination-adjustment and the pivot-free region.

Figure 20:
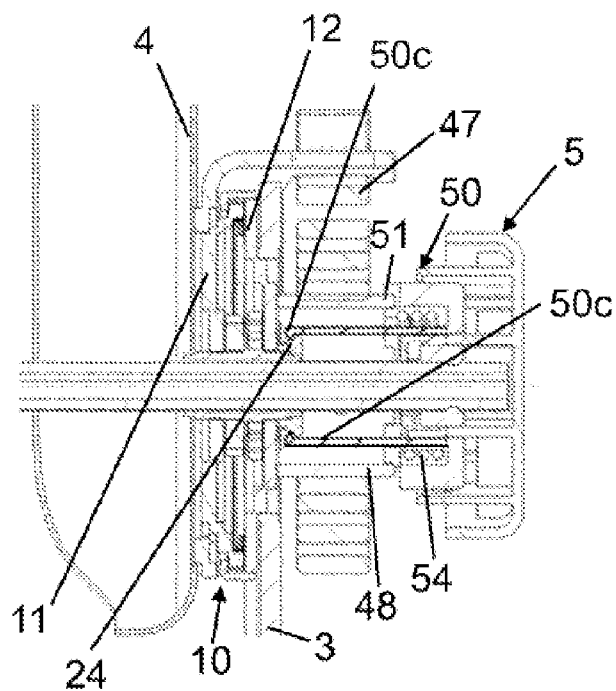
FIG. 20 is an axial section through the fitting, stop module, hand lever and a back rest compensation spring supported in a modified manner.
Figure 21:
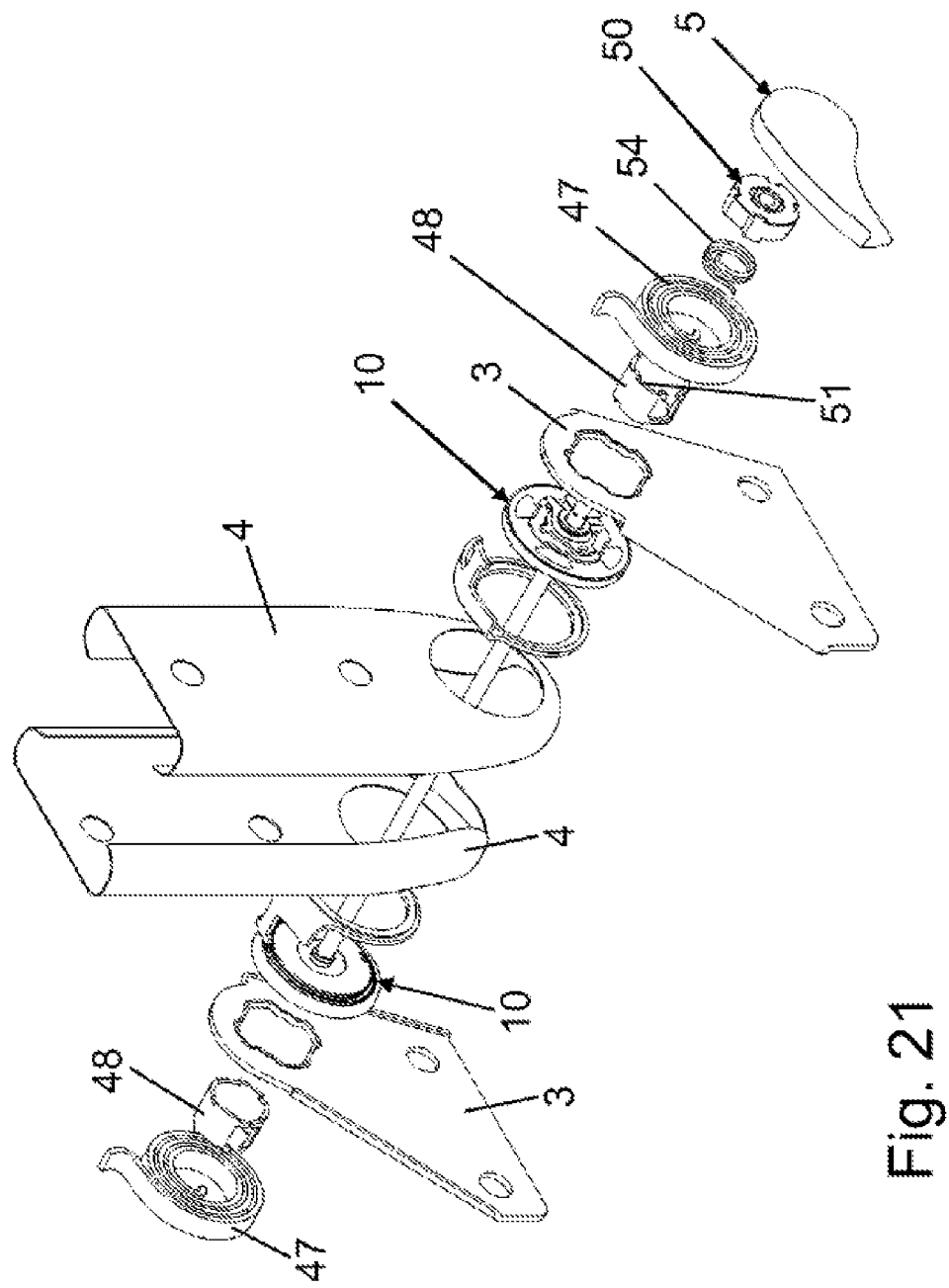
FIG. 21 is an exploded illustration of the fitting system of FIG. 20 with a schematized resetting spring.
Figure 22:
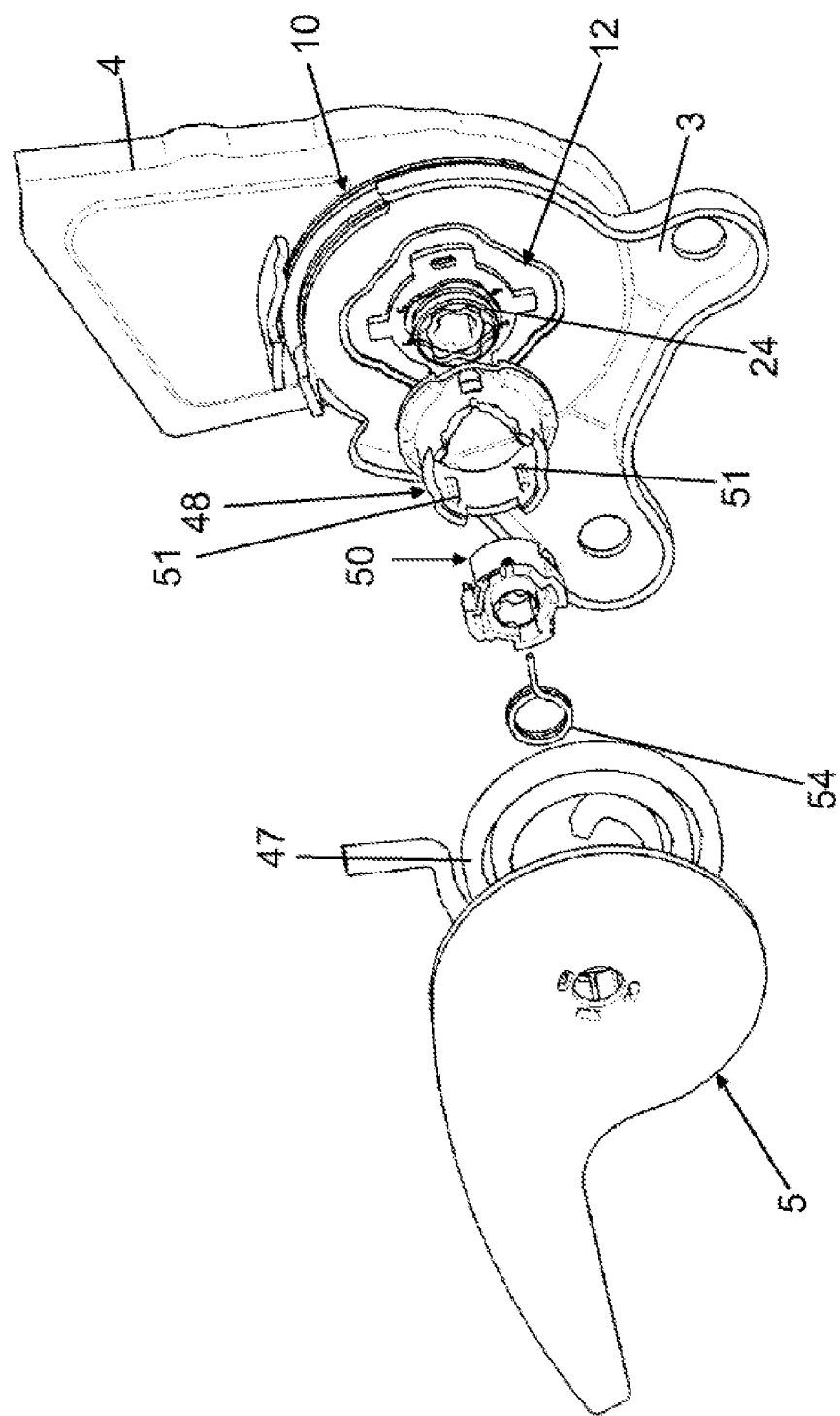
FIG. 22 is a perspective view of a part of the fitting system with the stop module mounted in a modified manner and with a schematized resetting spring.
Figure 23:
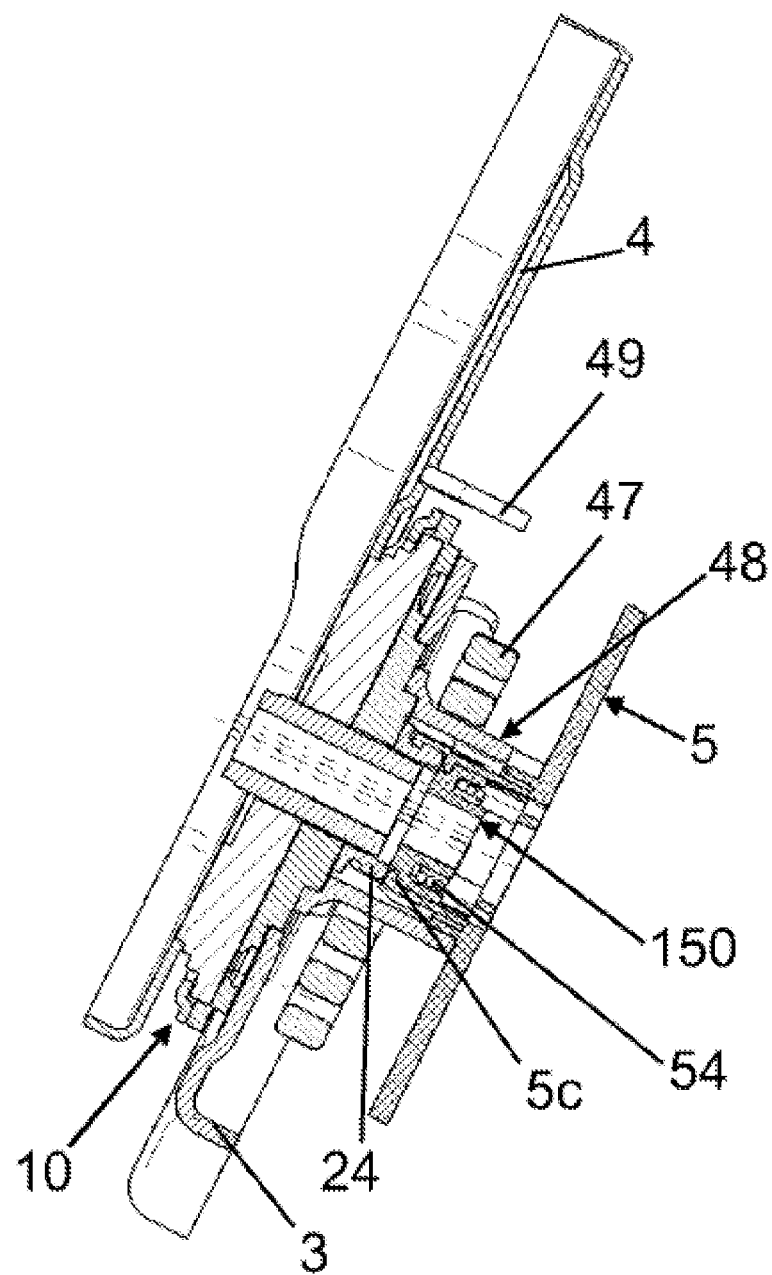
FIG. 23 is an axial section through FIG. 22.

Various modifications in respect of the stop module 50 or the supporting bushing 48 are also possible. The supporting bushing 48 can thus be fitted on that side of the fitting 10 which faces the hand lever 5, i.e., in the present case, on the second fitting part 12 (FIG. 20, FIG. 21). The counter stop 51 for the stop module 50 is then formed on the supporting bushing 48, for example in the form of axial projections, which are designed in a crenelated manner, of the supporting bushing 48. The clip hooks 50*c* of the stop module 50, which clip hooks are clipped to the fastening ring 24, are extended somewhat around the axial size of the supporting bushing 48. Alternatively, the stop module 50 is mounted within the supporting bushing 48 and interacts as a counter stop 51 with, for example, rib-like projections on the inner wall of the supporting bushing 48 (FIG. 22, FIG. 23). The two modifications are possible both with at least one shaped section 54*f* on the resetting spring 54 and with at least one shaped section 54*f* on a separate shaped spring.

Figure 24:
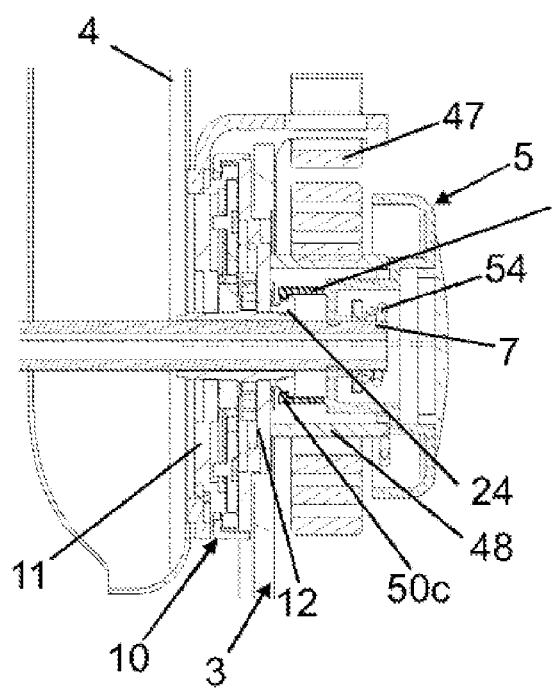
FIG. 24 is an axial section through the fitting, back rest compensation spring and a hand lever, which is formed integrally with the stop module, of the second exemplary embodiment.
Figure 25:
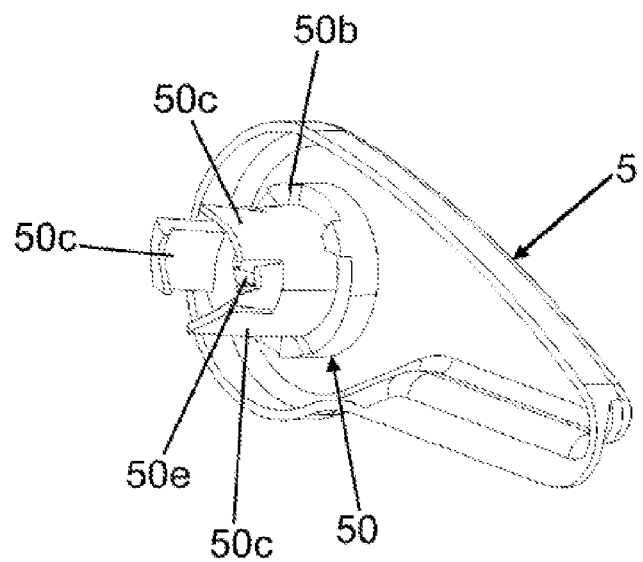
FIG. 25 is a perspective view of the hand lever formed integrally with the stop module.

Finally, the stop module 50 can be integrally formed with the hand lever 5, with the elements effective in between being omitted, specifically both without the supporting bushing 48, i.e. with direct interaction with a counter stop 51 on the fitting 10, and also with the supporting bushing 48, i.e. with interaction with a counter stop 51 on the supporting bushing 48 (FIG. 24, FIG. 25). Both modifications are possible both with at least one shaped section 54*f* on the resetting spring 54 and with at least one shaped section 54*f* on a separate shaped spring.

While specific embodiments of the invention have been shown and described in detail to illustrate the application of the principles of the invention, it will be understood that the invention may be embodied otherwise without departing from such principles.

The invention claimed is:

1. A fitting system for a vehicle seat, the fitting system comprising:
   at least one fitting which has a first fitting part and a second fitting part which are lockable to each other and are rotatable relative to each other about an axis;
   a spring arrangement producing a torque;
   a transmission rod, the rotation of which, during an unlocking operation, unlocks the fitting counter to the torque which follows a spring arrangement characteristic and is produced by the spring arrangement;
   a hand lever for initiating the unlocking operation, the actuation of which hand lever rotates the transmission rod; and
   a shaped spring effective between a first component and a second component which, during the unlocking operation, rotate, relative to each other, wherein the torque produced by the shaped spring follows a non-linear shaped spring characteristic which, together with an at least approximately linear spring arrangement characteristic of the spring arrangement, results in an overall characteristic, wherein, during the unlocking operation, because of the non-linear shaped spring characteristic, the shaped spring first produces a closing torque and then an opening torque.

2. The fitting system as claimed in claim 1, wherein the shaped spring has a basic body which is supported on the first component, connected thereto, in a torsionally rigid manner, and at least one spring arm which bears against the second component.

3. The fitting system as claimed in claim 2, wherein the at least one spring arm bears at a contact point against at least one contour of the second component, said contour projecting radially toward the shaped spring and deflecting the at least one spring arm.

4. The fitting system as claimed in claim 3, wherein, during the unlocking operation, the at least one spring arm and the at least one contour move relative to each other and thereby change the deflection of the spring arm and the direction of action of the forces.

5. The fitting system as claimed in claim 2, wherein a plurality of spring arms which are of identical design to one another are arranged on the basic body uniformly in the circumferential direction with respect to the axis.

6. The fitting system as claimed in claim 1, wherein:
   a toothed ring is formed on the first fitting part;
   the second fitting part guides radially displaceable locking bars which interact with the toothed ring in order to lock the fitting;
   the spring arrangement acts upon an eccentric which is mounted rotatably, is rotatable by means of a driver and acts upon the locking bars; and
   the transmission rod, when rotated, rotates the driver which thereby rotates the eccentric.

7. The fitting system as claimed in claim 6, wherein a stop module is provided between the hand lever and the transmission rod, said stop module bringing the hand lever and one of the fitting parts to a stop relative to each other in at least one direction of rotation, wherein the shaped spring is provided between the stop module as the first component and that one of the fitting parts, which acts as a stop or a supporting bushing fastened to said fitting part, as the second component.

8. The fitting system as claimed in claim 6, wherein the shaped spring is provided between one of the two fitting parts as the first component and the eccentric as the second component.

9. The fitting system as claimed in claim 1, wherein:
   a toothed ring is formed on the first fitting part;
   the second fitting part guides radially displaceable locking bars which interact with the toothed ring in order to lock the fitting;
   the spring arrangement acts upon an eccentric which is mounted rotatably, is rotatable by means of a driver (21) and, acts upon the locking bars; and
   the transmission rod, when the latter is rotated, rotates the driver which thereby rotates the eccentric.

10. A vehicle seat comprising:
    a seat part;
    a back rest; and
    a fitting system attaching the back rest to the seat part, whereby the back rest is pivotable relative thereto and is lockable at different inclination settings, the fitting system comprising:
    a fitting comprising a first fitting part and a second fitting part which are lockable to each other and are rotatable relative to each other about an axis;
    a spring arrangement producing a torque;
    a transmission rod rotating during an unlocking operation to unlock the fitting counter to the torque which follows a characteristic and is produced by the spring arrangement;
    a hand lever for initiating the unlocking operation, the actuation of which hand lever rotates the transmission rod; and
    a shaped spring effective between a first component and a second component which, during the unlocking operation, rotate, relative to each other, wherein the torque produced by the shaped spring follows a non-linear characteristic which, together with an at least approximately linear characteristic of the spring arrangement, results in an overall characteristic, wherein, during the unlocking operation, because of the non-linear characteristic the shaped spring first produces a closing torque and then an opening torque.

11. The vehicle seat as claimed in claim 10, wherein the shaped spring has a basic body which is supported on the first component, in a torsionally rigid manner, and at least one spring arm which bears against the second component.

12. The vehicle seat as claimed in claim 11, wherein the at least one spring arm bears at a contact point against at least one contour of the second component, said contour projecting radially toward the shaped spring and deflecting the at least one spring arm.

13. The vehicle seat as claimed in claim 12, wherein, during the unlocking operation, the at least one spring arm and the at least one contour move relative to each other and thereby change the deflection of the spring arm and the direction of action of the forces.

14. The vehicle seat as claimed in claim 10, wherein:
    a toothed ring is formed on the first fitting part;
    the second fitting part guides radially displaceable locking bars which interact with the toothed ring in order to lock the fitting;
    the spring arrangement acts upon an eccentric which is mounted rotatably, is rotatable by means of a driver and acts upon the locking bars; and
    the transmission rod, when rotated, rotates the driver which thereby rotates the eccentric.

15. The vehicle seat as claimed in claim 14, wherein a stop module is provided between the hand lever and the transmission rod, said stop module bringing the hand lever and one of the fitting parts to a stop relative to each other in at least one direction of rotation, wherein the shaped spring is provided between the stop module as the first component and one of the fitting parts, which acts as a stop or a supporting bushing fastened to said fitting part, as the second component.

16. A fitting arrangement for a connecting a back rest to a seat part, the arrangement comprising:
  a first fitting part adapted to connect to one of the back rest and the seat part;
  a second fitting part adapted to connect to the other of the back rest and the seat part, said second fitting part being pivotally connected to said first fitting part to pivot the back rest with respect to the seat part;
  a locking mechanism selectively locking and unlocking said first fitting part with respect to said second fitting part;
  a locking spring biasing said locking mechanism to lock said first part to said second part, said locking spring having a locking spring characteristic relating deformation of said locking spring to a biasing force of said locking spring;
  a handle connected to said locking mechanism, movement of said handle between a first position and a second position operating said locking mechanism to lock and unlock said first fitting part from said second fitting part, said locking spring biasing said handle into said first position;
  a shaped spring biasing said handle with respect to said locking mechanism, said shaped spring having a shaped spring characteristic relating the formation of said shaped spring to biasing force of said shaped spring, said shaped spring characteristic having a maximum biasing force at a predetermined point in the movement of said handle between said first and second positions of said handle, said predetermined point being spaced from said first and second positions of said handle.

17. A fitting arrangement in accordance with claim 16, wherein:
  said locking spring characteristic and said shaped spring characteristic combine to form an overall biasing force characteristic on said handle, said overall biasing force characteristic having a maximum at a predetermined handle point spaced from said first and second positions of said handle.

18. A fitting arrangement in accordance with claim 16, wherein:
  said shaped spring characteristic biases said handle into said first position during a first portion of movement between said first and second positions;
  said shaped spring characteristic biases said handle into said second position during a second portion of movement between said first and second positions.

19. A fitting arrangement in accordance with claim 18, wherein:
  said first portion of movement is closer to said first position than said second position;
  said second portion of movement is closer to said second position than said first position.

20. A fitting arrangement in accordance with claim 16, wherein:
  said shaped spring characteristic has a deviation from a linear approximation of said shaped spring characteristic that is greater than a deviation from a linear approximation of said locking spring characteristic.

* * * * *